(12) United States Patent
Alaimo et al.

(10) Patent No.: US 8,725,780 B2
(45) Date of Patent: May 13, 2014

(54) METHODS AND SYSTEMS FOR RULE-BASED WORM ENFORCEMENT

(75) Inventors: S. Christopher Alaimo, Boulder, CO (US); Matthew D. Bondurant, Superior, CO (US); Payman Dadashpour, Boulder, CO (US)

(73) Assignee: Imation Corp., Oakdale, MN (US)

( * ) Notice: Subject to any disclaimer, the term of this patent is extended or adjusted under 35 U.S.C. 154(b) by 126 days.

(21) Appl. No.: 12/786,740

(22) Filed: May 25, 2010

(65) Prior Publication Data

US 2010/0318501 A1    Dec. 16, 2010

Related U.S. Application Data

(60) Provisional application No. 61/186,438, filed on Jun. 12, 2009.

(51) Int. Cl.
*G06F 17/30* (2006.01)

(52) U.S. Cl.
USPC ......................................................... 707/821

(58) Field of Classification Search
CPC ................................................ G06F 17/20188
See application file for complete search history.

(56) References Cited

U.S. PATENT DOCUMENTS

| | | | |
|---|---|---|---|
| 5,233,576 A * | 8/1993 | Curtis et al. | ............... 369/13.02 |
| 5,360,651 A | 11/1994 | Baxter et al. | |
| 6,487,474 B1 | 11/2002 | Goodman et al. | |
| 6,779,080 B2 | 8/2004 | Basham et al. | |
| 7,631,161 B2 | 12/2009 | Haustein et al. | |
| 7,685,389 B2 | 3/2010 | Haustein et al. | |
| 7,694,096 B2 | 4/2010 | Haustein et al. | |
| 8,171,244 B2 | 5/2012 | Bondurant et al. | |
| 2002/0035665 A1 | 3/2002 | Basham et al. | |
| 2004/0133740 A1 | 7/2004 | Prewitt | |

(Continued)

FOREIGN PATENT DOCUMENTS

| | | |
|---|---|---|
| EP | 1688832 | 9/2005 |
| JP | 2006-065710 | 3/2006 |

(Continued)

OTHER PUBLICATIONS

Heeseung Jo et al. "FAB: flash-aware buffer management policy for portable media players," Consumer Electronics, IEEE Transactions on Consumer Electronics, 52(2): 485-493 (May 2006).

*Primary Examiner* — Hung Q Pham
(74) *Attorney, Agent, or Firm* — Dorsey & Whitney LLP

(57) ABSTRACT

Systems and methods for storing and accessing data on a removable media having a changeable data set and an immutable data set. In one embodiment, a system can comprise a removable media storage system adapted to determine whether a host system running one or more applications is configured to enforce Write Once Read Many (WORM) policies. The host system can be communicatively coupled with the removable media storage system and configured to execute instructions causing the host system to determine whether to allow or deny a request to access data on the removable media. The host system can use rules to determine if an access request is to access data of a changeable data set or a immutable data set. If the request is to access data of the changeable data set, access is allowed. If the request is to access data of the immutable data set, reads are allowed, as well as writes of new data. Access requests to rename, delete, and/or write to existing data of the immutable data set are denied.

21 Claims, 7 Drawing Sheets

(56) References Cited

U.S. PATENT DOCUMENTS

| | | |
|---|---|---|
| 2005/0162991 A1 | 7/2005 | Matsuura |
| 2005/0231846 A1 | 10/2005 | Winarski et al. |
| 2006/0123232 A1* | 6/2006 | Cannon et al. ............... 713/165 |
| 2006/0179087 A1 | 8/2006 | Fujii et al. |
| 2006/0230085 A1 | 10/2006 | Strahl et al. |
| 2007/0078890 A1* | 4/2007 | Hsu et al. ................ 707/103 R |
| 2007/0094468 A1 | 4/2007 | Haustein et al. |
| 2007/0219948 A1 | 9/2007 | Bugovics |
| 2008/0040723 A1 | 2/2008 | Haustein et al. |
| 2009/0100224 A1 | 4/2009 | Wang |
| 2009/0132774 A1 | 5/2009 | Bondurant et al. |
| 2010/0017559 A1* | 1/2010 | Fruin et al. ................... 711/103 |

FOREIGN PATENT DOCUMENTS

| | | |
|---|---|---|
| JP | 2006-215954 | 8/2006 |
| WO | WO 02/25445 A2 | 3/2002 |
| WO | WO 2004/090884 | 10/2004 |
| WO | WO 2006/134020 | 12/2006 |

* cited by examiner

METHODS AND SYSTEMS FOR RULE-BASED WORM ENFORCEMENT

CROSS-REFERENCES TO RELATED APPLICATIONS

This claims priority to Provisional U.S. Patent Application No. 61/186,438, filed Jun. 12, 2009, entitled "METHODS AND SYSTEMS FOR RULE-BASED WORM ENFORCEMENT," of which the entire disclosure is hereby incorporated by reference for all purposes. This application also relates to U.S. patent application Ser. No. 12/199,286, filed Aug. 27, 2008, entitled "METHODS FOR IMPLEMENTATION OF WORM ENFORCEMENT IN A STORAGE SYSTEM," which is incorporated herein by reference in its entirety for all purposes.

BACKGROUND OF THE INVENTION

Embodiments of the present invention generally relate to storage systems and, more specifically, but not by way of limitation, to rule-based Write Once Read Many (WORM) enforcement in data storage systems.

In certain industries, such as healthcare and financial services, government regulations impose requirements on the storage and management of important records. One common requirement is that data storage systems that store certain important records must enforce immutability. That is, they must guarantee that stored records cannot be overwritten. Enforcement of this guarantee is often called Write Once Read Many, or WORM.

Within such regulated industries, not all records require WORM data storage. For example, a records management application may utilize a database to store information about important records. However, this information may contain a mix of changeable data and immutable data, i.e., information subject to rule(s) related to immutability. Additionally, this database changes as the application adds new and/or edits records. Because the database contains changeable data, it cannot be stored on a WORM data storage system.

Businesses that require both WORM and non-WORM data storage for different types of data are typically forced to separate immutable data from changeable data. As a result, immutable data and changeable data often reside on different storage devices. Additionally, many of these same businesses desire to store their important records on removable media. There are several options for WORM storage to removable media, including DVD, BluRay, UDO, LTO tape, and others. However, none of these options allow the combination of immutable data and changeable data on the same removable element. All data is immutable, regardless of the type. As a result, businesses cannot use removable WORM media to store changeable data, such as database files. Hence, there is a need in the art for improved methods and systems for enforcing WORM data storage.

SUMMARY OF THE INVENTION

The present invention is directed toward systems and methods for storing and accessing data on a removable media having a changeable data set and an immutable data set. In one embodiment, the system comprises a removable media storage system adapted to determine whether a host system running one or more applications is configured to enforce Write Once Read Many (WORM) policies. The host system can be communicatively coupled with the removable media storage system and configured to execute instructions causing the host system to determine whether to allow or deny a request to access data on the removable media. If the request is to access data of the changeable data set, access is allowed. If the request is to access data of the immutable data set, reads are allowed, as well as writes of new data. Access requests to rename, delete and/or write to existing data of the immutable data set are denied.

The present invention additionally allows for a host system to use rules to determine the data in immutable data set, the changeable data set, or both. These rules may be stored on one or more of the removable media, the removable media storage system, the host system communicatively coupled with a removable media storage system, or any combination thereof. Furthermore, the rules can be based on a variety of factors such as the name of the directory and/or location of the data on the removable media, length of time data has been stored on the removable media, a time and/or date, access rights of a person using the host system, access rights of a person who caused data to be stored on the removable media, type of data stored on the removable media, and the type of removable media. These rules also can be configurable by a user.

The removable media employed by the disclosed systems and methods disclosed can utilize one or more of various storage types such as optical, magnetic, magneto-optical, and flash memory storage. Moreover, the removable media storage system and the removable media may be housed in a single module, the module being removable from the host system.

DETAILED DESCRIPTION OF THE INVENTION

Figure 1:
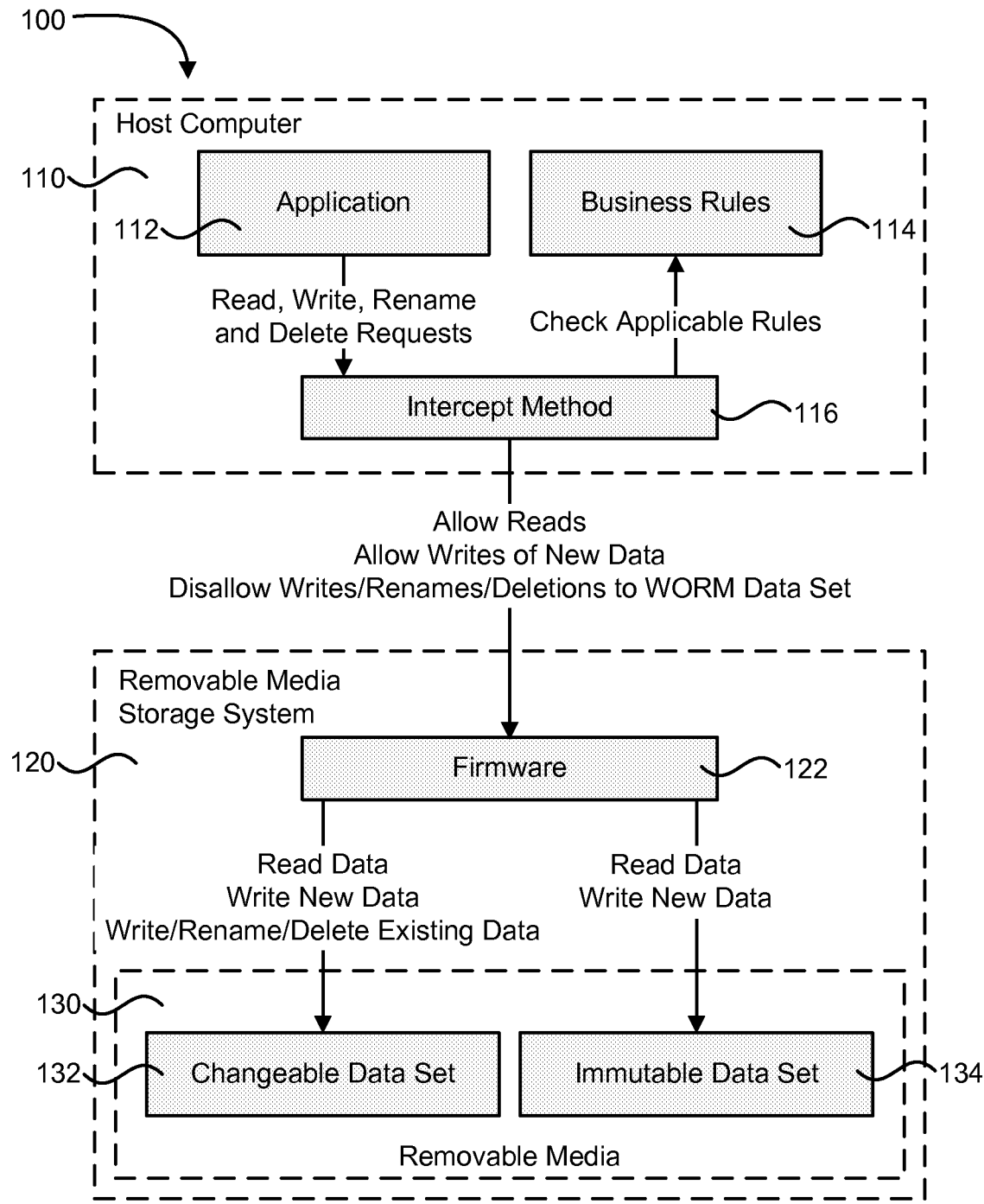
FIG. 1 is a block diagram illustrating a system and intercept method implemented according to one embodiment of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide systems and methods for a data storage system that can combine both immutable data and changeable data onto a single removable disk cartridge or other storage media while enforcing Write Once Read Many (WORM) policies on the immutable data. The data storage system enforces immutability on records designated as immutable, and allows applications to modify or delete records designated as changeable. As used herein, the term immutable data refers to data of a database or other data store that is subject to any number of requirements, including but not limited to those imposed governmental and/or other organizations, regarding storage and/or retention of various types of records, e.g., requirements of the Securities and Exchange Commission (SEC) regarding the retention of financial records. In contrast, changeable data is considered to be that data not subject to such storage and/or retention requirements and which may be changed from time to time during normal operation of applications utilizing that data. The present invention provides for both changeable and immutable data storage on a single removable media, thereby allowing users to avoid costly alternatives that may include employing two different data storage systems.

It should be noted that, while reference is made herein to storing immutable data, in some cases in combination with changeable data, on a removable disk, it should be understood that embodiments of the present invention need not be limited to this or any other particular type of storage medium. For example, embodiments of the present invention may also be implemented with storage media including but not limited to rewritable forms of DVD, BluRay, UDO, and LTO tape, and others, as well as other removable media based on optical storage, flash memory, magnetic storage, magneto-optical storage, and others.

More specifically, embodiments of the present invention provide for an intercept method intercepting accesses from an application executed by host computer to a removable media storage system. The intercept method can use a set of rules to determine if the data set to be accessed is immutable or changeable. If the data set is immutable, the intercept method can allow writes of new data and reads of existing data. The intercept method also can deny modification within the immutable data set, such as deletion, renaming, attribute modification, and/or writes to existing data. (As used herein, the term "renaming" includes operations that change the name of a file or other data. This can include operations that change a name to accomplish any of a variety of tasks, such as an operation to move a file.) If the data set is changeable, the intercept method can allow full access. That is, the intercept method can allow operations such as writes, reads, renaming, the changing of file attributes, and/or deletions of any data within the changeable data set.

Embodiments of the present invention further provide for a removable media storage system that can determine whether a removable media is WORM compatible. This can be as simple as, for example, reading metadata stored by the removable media indicating whether the removable media is formatted or otherwise configured for WORM functionality.

Upon determining the removable media is WORM compatible, the removable media storage system can further determine whether a host system is running a compatible intercept method. Namely, an intercept method providing WORM and non-WORM enforcement as described above. If the removable media storage system determines that a host system is indeed running a compatible intercept method, then the removable storage system can give the host system full access to the data on a removable media, the intercept method allowing or denying access to the immutable data set and changeable data set as described above. If the removable media storage system determines that a host system is not running an intercept method enforcing WORM policies, then the removable media storage system can grant read-only access to the host computer system, thereby ensuring the integrity of the data on the removable media.

The rules used by the intercept method to determine whether data is immutable can be stored in one or more locations. For instance, according to some embodiments, rules can be stored on the memory of a host computer, a removable media storage system, or both. Storing the rules on these systems can enable universal application of certain rules among multiple host computers and/or removable media storage systems. Each host computer, for instance, could contain and enforce a rule requiring immutable data to be stored in a certain directory on a removable media. On the other hand, rules may also be stored on each removable media, thereby allowing a removable media to contain rules unique to that media. Additionally, rules may be stored in any combination of a removable media, a host computer, a removable media storage system, and any other data-containing medium communicatively coupled thereto. Such combinations can allow for the application of universal rules and unique rules to a particular removable media.

The rules used to determine which data is immutable and/or which data is changeable can be configurable by a user, seller, distributor, and/or manufacturer of the removable media storage system and or the removable media. Various techniques can be employed utilizing hardware and or software to ensure the rules are not altered, such as storing the rules in Read Only Memory (ROM) or secured flash memory, hard coding rules into software, creating safeguards in firmware and/or drivers, and/or other methods. Furthermore the rules can be based on any number of factors. According to some embodiments, rules can be based on the name of the directory and/or location of the data on the removable media, such that the removable media stores a first set of one or more directories having immutable data and a second set of one or more directories having changeable data.

Rules may be based on the type of data stored on the removable media. Not only can this include rules based on file types, but whether the data is a file, a directory, or something else. Furthermore, rules may be based on whether a directory contains certain file types and/or immutable data, thereby providing a level of enforcement around folders in addition to files within the immutable area. For instance, rules may allow the rename/delete of empty directories, but prevent modification if a directory contains any files. Stated another way, rules can ensure, for any files in the immutable area, the full path to the file would not be changeable.

Other rules can factor in the length of time data has been stored on the removable media, such that data becomes immutable or changeable after a certain period of time. For instance, one rule can cause changeable data to become immutable if it remains on the removable media for longer than 24 hours. Another rule could cause immutable data to become changeable if it is on the removable media for longer than 10 years. Such rules can be used in combination, and can be adjusted to factor in any length of time.

Rules based on other factors are also contemplated by the present invention. These rules include, but are not limited to, rules based on date, time, access rights of a person using the host system, access rights of a person who caused data to be stored on the removable media the type of removable media, and more. This flexibility allows the present invention to be configured to accommodate any number of rules and combinations of rules that a user might need to govern the immutability of the data on removable media.

According to some embodiments of the present invention, the removable media and the removable media storage system may be housed as a single module or device. For instance, a Universal Serial Bus (USB) flash-based device may include flash memory and a microprocessor for executing any instructions required by the removable media storage system. Alternatively, such a device may include firmware, microcode, and/or other instructions to be executed by the host computer system. When used in conjunction with an intercept method, such a USB device would not only provide functionality of the removable media, but also removable media storage system by ensuring the media is configured for WORM functionality and the cost computer system is executing a compatible Other embodiments of the present invention include a removable media storage system separate from the removable media. The removable media storage system may comprise a device, such as an external computer drive, communicatively linked to a host computer system. The communicative link between the removable media storage system and a host computer system can comprise any number of data communication channels, including but not limited to USB, eSATA, Firewire, SCSI, optical, and wireless communication. Such a device can be adapted to read, write, rename, and delete to one or more types of removable media, such as rewritable forms of DVD, BluRay, UDO, LTO, and other removable media containing magnetic, optical, magneto-optical, flash memory, and/or other forms of storage.

FIG. 1 is a block diagram illustrating a system 100 implemented according to one embodiment of the present invention. A host computer 110 is coupled with a removable media storage system 120. Removable media storage system 120 contains firmware 122 which can determine whether host computer 110 is executing an intercept method 116, capable of enforcing WORM policies on immutable data and enabling access to changeable data. Among other techniques, this determination may be made with a simple handshake between the intercept method and the firmware. If intercept method 116 is present, the firmware can grant the host system 110, and/or application 112, access to read, write, rename, and delete the data on the removable media. Otherwise the firmware can restrict access to read only.

If the host computer 110 is granted read, write, rename, and delete access to the removable media, the intercept method 116 can serve to enforce WORM policies on the removable media 130. To do so, the intercept method 116 can check business rules 114 to determine what data on the removable media should be included in the immutable data set 134 and what data should be included in the changeable data set 132. As discussed above, business rules 114 not only may be located on the host computer 110, but additionally or alternatively may be located on the removable media, the removable media storage system, or both. The intercept method 116 may access rules 114 at different times, according to different embodiments, such as when the removable media 130 is initially inserted into the removable media storage system 120, when the removable media storage system 120 is initially coupled with host computer 110, when host system 110 initially boots up, and/or upon receiving an access request from an application 112.

Upon receiving a request from a program 112 to access data of the removable media 130, the intercept method 116 can grant full access to the changeable data set 132, or limited WORM access to the immutable data set 134. That is, the intercept method 116 can allow reads, writes, renames, and deletes of data of the changeable data set; allow reads of data of the immutable data set 132; allow writes of new data of the immutable data set 132; and disallow deletes, renames, or writes to existing data of the immutable data set 132.

Stated another way, the system of FIG. 1 can comprise a removable media storage system adapted to determine whether a host system running one or more applications is configured to enforce WORM policies, the host system being communicatively coupled with the removable media storage system. The host system further can be configured to execute an intercept method which enforces WORM policies. The method can include instructions causing the host system to receive a request to access data on the removable media and determine whether to allow or deny access. If the request is to access data of the changeable data set, access is allowed. If the request is to read data of the immutable data set or write new data of the immutable data set, access is also allowed. However, access is denied if the request is to write to existing data of the immutable data set, rename data of the immutable data set, or delete data of the immutable data set.

Figure 2:
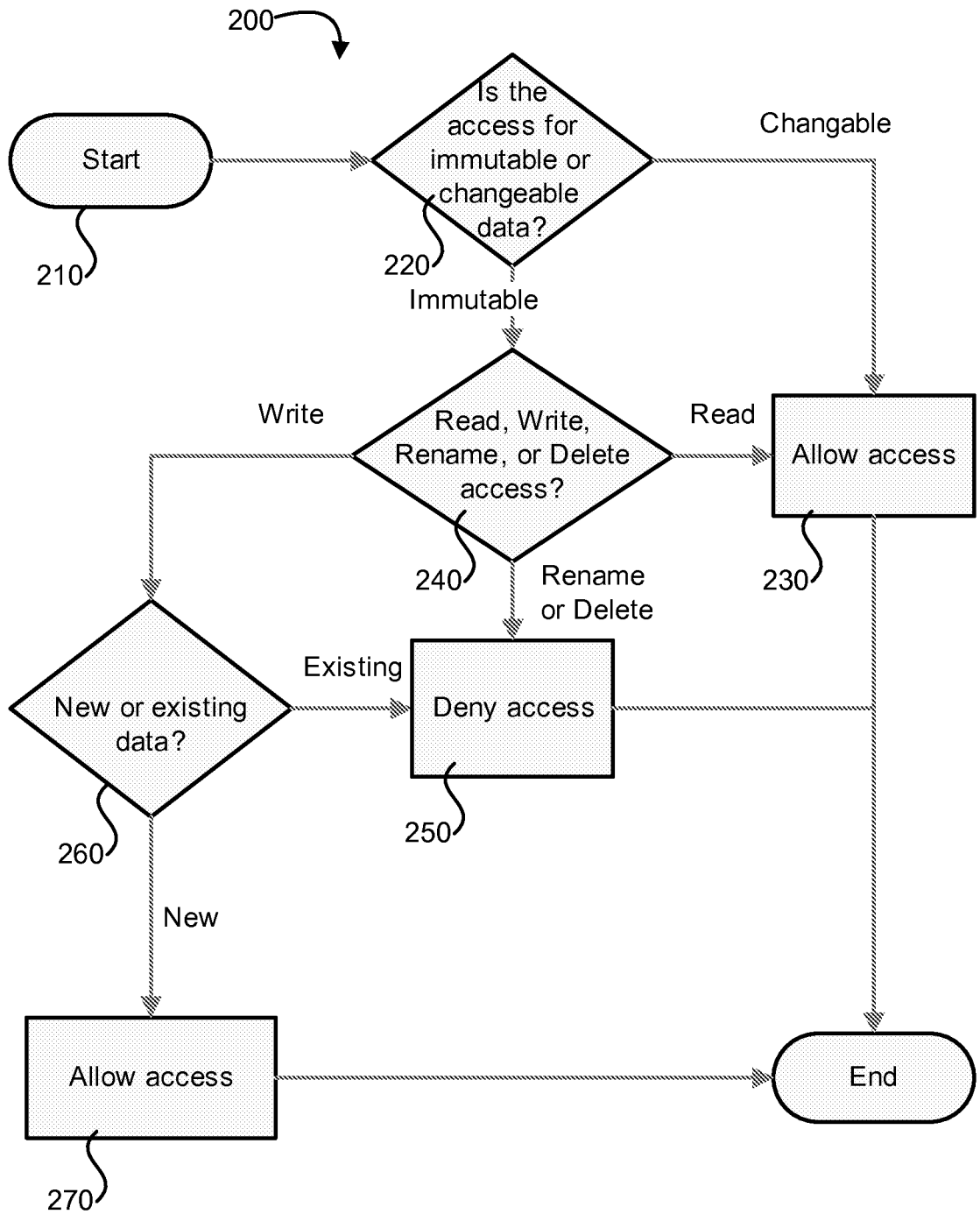
FIG. 2 is a flowchart illustrating an intercept method according to one embodiment of the present invention.

FIG. 2 is a flowchart illustrating an intercept method 200 according to one embodiment of the present invention. The intercept method may implement several different rules to distinguish immutable data from changeable data, as discussed above. In one embodiment, all data stored within a top-level folder with a certain hard-coded name are considered to be changeable. As previously stated, protection methods can ensure that the application only sets the rules once, thereby prohibiting the same application or applications on another host computer from changing the rules.

Intercept method 200 illustrates a method enforcing WORM policies on a removable media having stored thereon a changeable data set and an immutable data set. The method 200 can start 210 upon receiving a request to access data on the removable media. Block 220 shows that a determination is made of whether the request is to access data of the changeable data set or data of the immutable data set. At block 230, in response to determining the request is to access data of the changeable data set, access is allowed. In response to determining the request is to access data of the immutable data set, a further determination is made whether the access is to read data from the immutable data set, write data to the immutable data set, rename data of the immutable data set, or delete data from the immutable data set, as shown by block 240. At block 230, in response to determining the access is to read data from the immutable data set, access is allowed. At block 250, in response to determining the access is to rename or delete data from the immutable data set, access is denied. At block 260, in response to determining the access is to write data to the immutable data set, a determination is further made whether the access is for writing to existing data of the immutable data set or for writing new data to the immutable data set. At block 250, in response to determining the access is for writing to existing data of the immutable data set, access is denied. Finally, at block 270, in response to determining the access is for writing new data of the immutable data set, access is allowed. It will be understood that this is merely an embodiment; allowing or denying access in accordance with the present invention may be achieved in numerous ways. Moreover, it will be understood that other operations involving the modification of immutable data, such as changing the attributes of a file (e.g., hidden, system, read-only, etc.) can be denied in a similar manner as a rename or delete operation depicted in FIG. 2.

Figure 3:
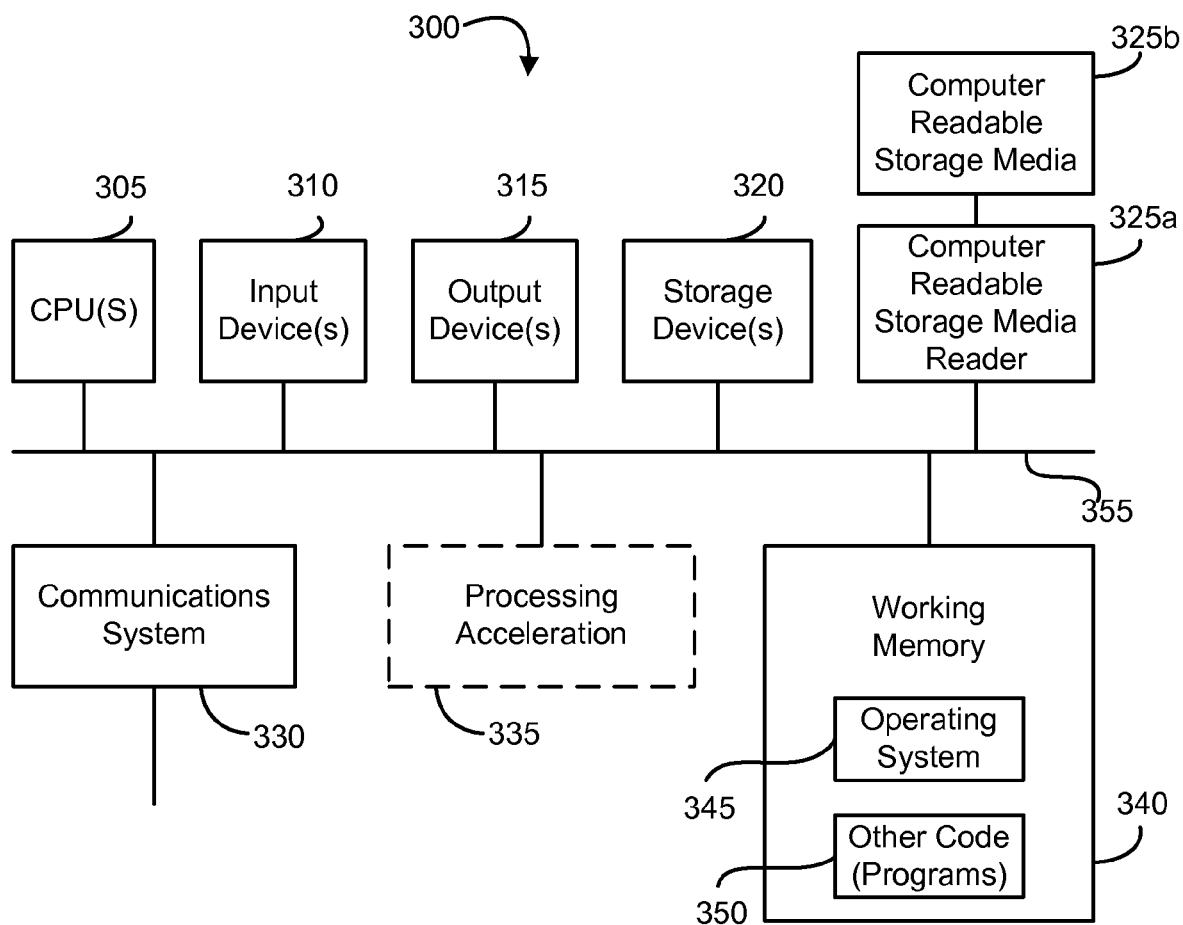
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above such as the host computer 110 described with reference to FIG. 1. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325*a*, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325*a* can further be connected to a computer-readable storage medium 325*b*, together (and, optionally, in combination with storage device(s) 320) comprehensively representing remote, local, fixed, and/or removable storage devices such as described herein plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350, such as an application program (which may be a client application, web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for implementing embodiments of the present invention as described herein such as the intercept process 200 described above with reference to FIG. 2.

Figure 4:
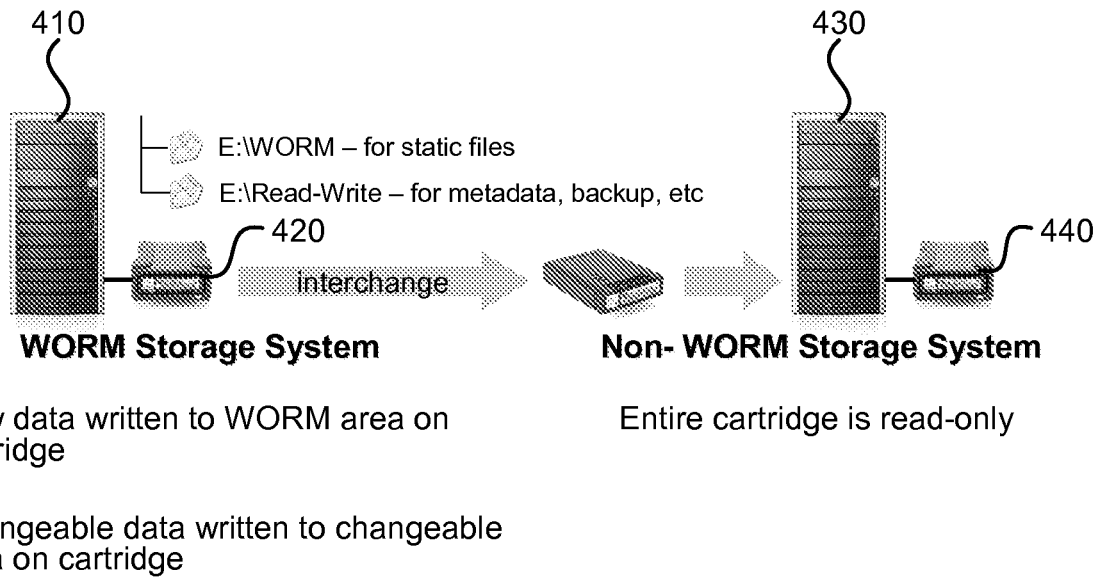
FIG. 4 is a diagram illustrating operation of WORM storage interchange between host computers according to one embodiment of the present invention.

Because the storage system uses a removable disk cartridge or other removable media, a user may move the cartridge or media from the first storage system that wrote the immutable data to a second storage system attached to a second host computer. FIG. 4 is a diagram illustrating operation of WORM storage interchange between host computers 410 and 430 according to one embodiment of the present invention. A first host computer 410 can execute an intercept method as described in FIGS. 1 and 2. Upon recognizing the first host computer 410 is executing an intercept method, a first storage system 420 can grant first host computer 410 full access to the removable media, enabling access to both immutable and changeable data as determined and allowed by the intercept method on first storage system 420. Such access can be granted, for example, through the use of one or more directories for immutable (WORM) data and one or more directories for changeable (read-write) data, as illustrated in FIG. 4.

The removable media can then be brought to a second host computer 430. The second host computer 430 can be prevented from modifying or deleting the immutable data stored on the removable media, if the first host computer 410 can employs a formatting application that configures the removable media as WORM. Nevertheless, the second host computer 430 may still access data on the removable media. If the second host computer 430 employs an intercept method as described above to intercept accesses from second host computer 430, a second removable media system 440 would grant second host computer 430 access to both immutable and changeable data as determined and allowed by the intercept method on second storage system 430, similar to the access granted to first host computer 410. On the other hand, if the second host computer 430 does not employ a compatible intercept method, the second removable media system 440 can grant second host computer 430 read-only access thereby preventing any change to data on the removable media.

When removable media is configured as WORM, a write-protection indication is configured in the media which other storage systems will, by default, interpret to mean that they are not allowed to write new data or modify existing data. The behavior is similar to that of having the physical write protect switch on the media set, but the WORM write-protection indication cannot be tampered with by the user. However, a system which employs a compatible method to intercept accesses from the system is able to understand the WORM write-protection indication and allow new files to be written while preventing the overwrite or deletion of existing immutable files. Because the removable media is configured as WORM, the second storage system 440 does not allow writes to any immutable data on the removable media.

While the intercept method enforces the access rules to guarantee that the data set designated as immutable is preserved as such, methods may be used to ensure that a user may not tamper with the intercept method. As discussed above, a removable media storage system can employ firmware that allows write access to the removable media only after determining the intercept method is operating properly. Otherwise, it can provide read-only access. Additionally or alternatively, an enforcement method running on the host computer can ensure compatibility of the intercept method, in which case the storage system would not allow write access until it receives a command from the enforcement method. This ensures that only host computers utilizing the intercept method may write to the media. If a user attempts to remove the intercept method from the host computer or halt execution, the storage system can disallow write access to the media. This prevents tampering from malicious users.

Stated another way, a system such as illustrated in and described above with reference to FIG. 1 can employ a method of enforcing WORM policies by determining whether at least a portion of the removable media is configured to store a changeable data set and an immutable data set. It is further determined whether a host system running one or more applications is configured to enforce WORM policies. In response to determining the host system is configured to enforce WORM policies, access is granted to the one or more applications to read, write data to, rename, and/or delete data from the changeable data set; write new data to the immutable data set; and/or read existing data from the immutable data set. In response to determining the host system is not configured to enforce WORM policies, the one or more applications are granted read-only access to the changeable and immutable data sets.

Figure 5:
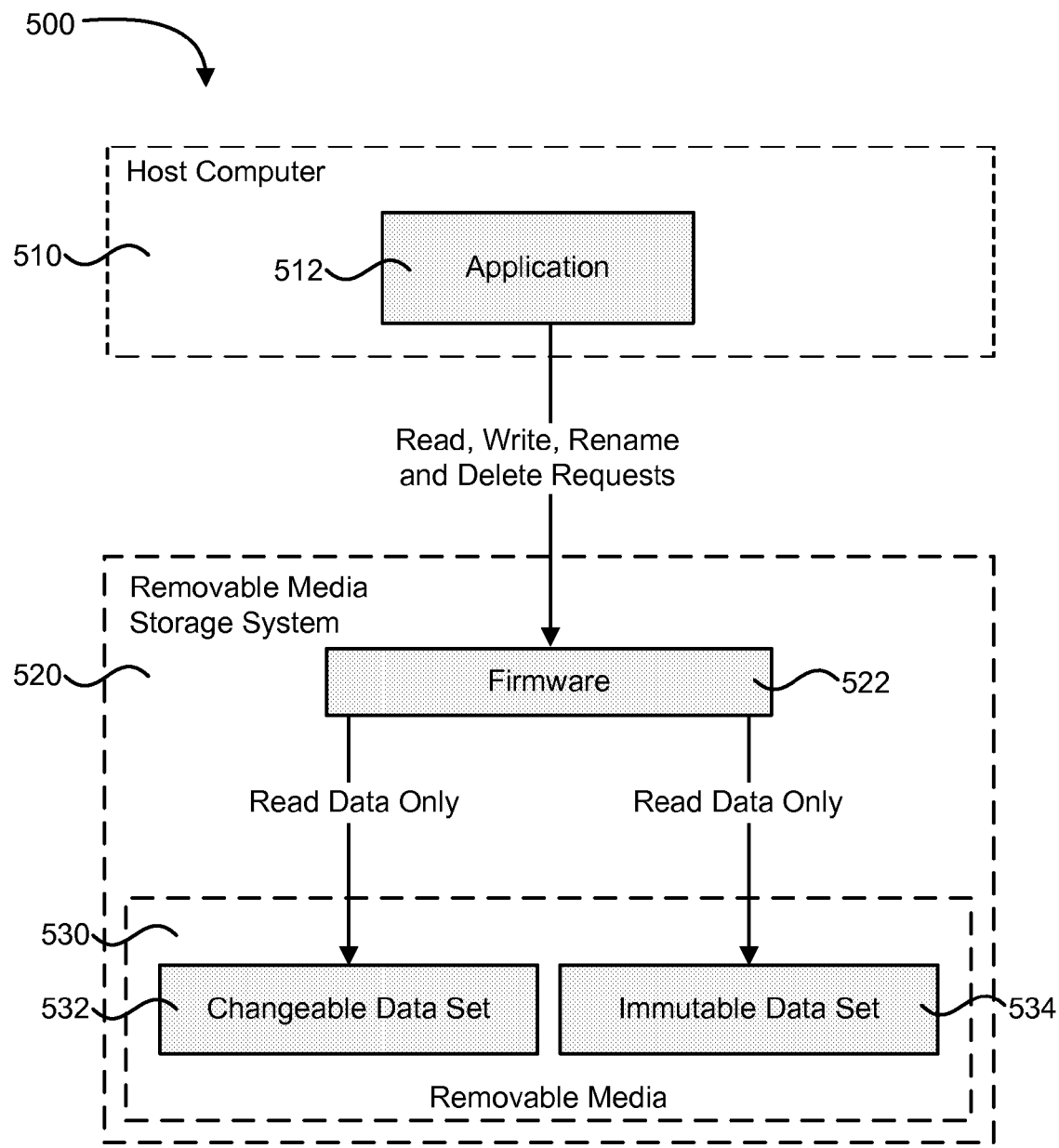
FIG. 5 is a block diagram illustrating functionality of a removable media storage a system coupled to a host computer with no intercept method implemented, according to one embodiment of the present invention.

FIG. 5 is a block diagram illustrating an embodiment of the read-only access provided by a removable media storage system 520. Host computer 510 runs application 512, but has no intercept method. Although application 512 can make read, write, rename, and delete requests of the data on the removable media 530, firmware 522 can ensure read-only access is granted to both the changeable data set 532 and immutable data set 534. In so doing, the firmware 522 preserves the integrity of the data on the removable media 530.

Figure 6:
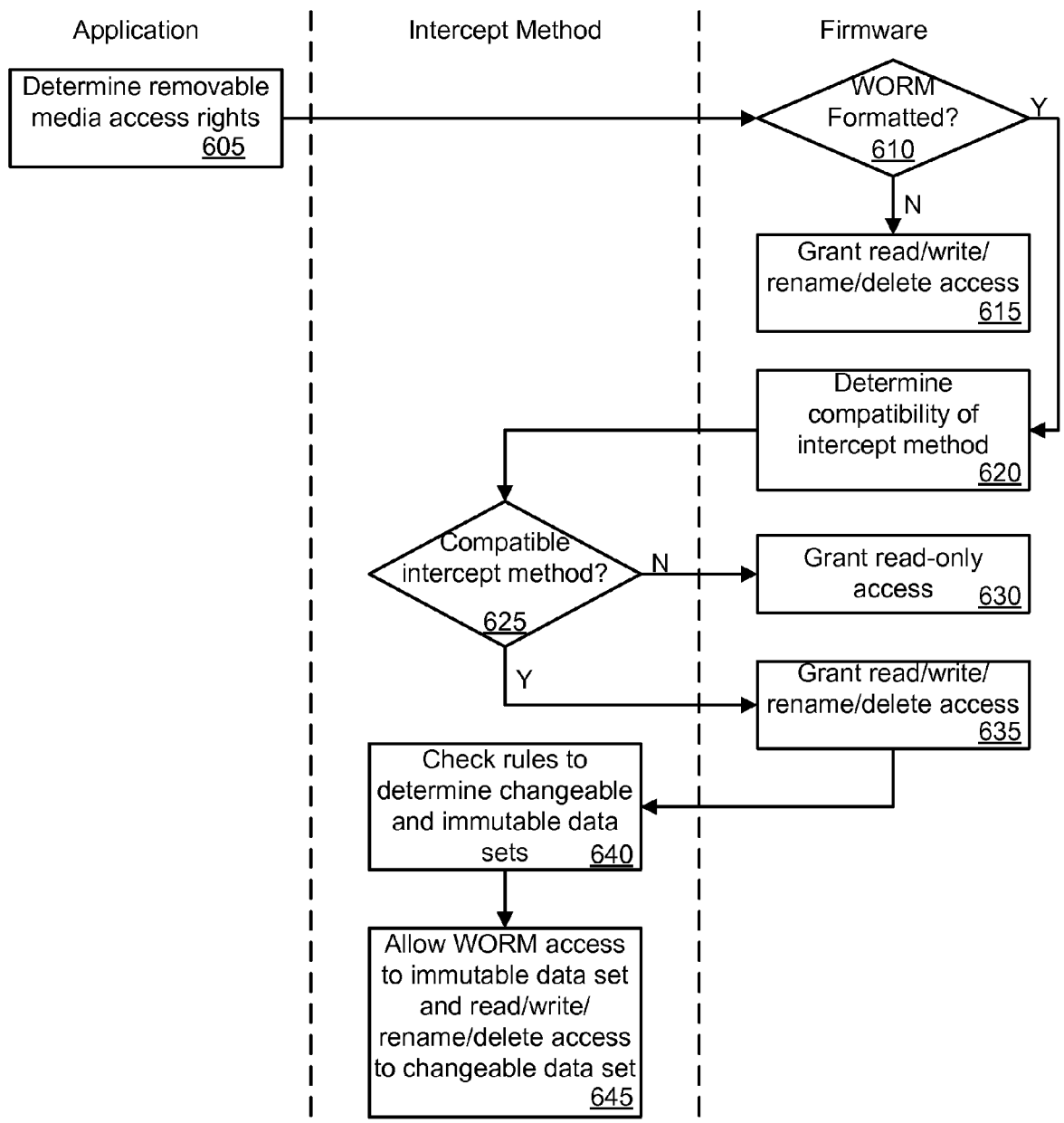
FIG. 6 is a diagram illustrating the interchange between an application, intercept method, and firmware to determine access rights to removable media, according to certain embodiments of the present invention.

FIG. 6 is a block diagram of how such a method may be performed by components of a system, according to one embodiment. At block 605, an application can send a request to determine removable media access rights, which can occur, for example, when a removable media is first inserted into the removable media storage system or is otherwise communicatively coupled with the host system. At block 610, the firmware or other enforcement program can determine whether the removable media is WORM formatted. As discussed above, this determination need not come at the prompting of an application and can be done upon inserting or otherwise connecting the removable media to the removable media storage system, after the removable media storage system is communicatively coupled with the host system, or at some other time. If the removable media is not WORM formatted, access to read, write, rename, and/or delete is granted 615.

If the removable media is WORM formatted, the firmware or other enforcement program can further determine whether a host system is executing a compatible intercept program 620. This can entail performing a handshake or other communication with the intercept method, as shown by block 625. If a compatible intercept method is not present, read-only access is granted 630. On the other hand, if a compatible intercept method is detected, the firmware or other enforcement program can grant access to perform reads, writes, renames, and deletes on the removable media, as shown by block 635. The intercept method can determine which data is changeable and which is immutable 640, and further restrict access to these data sets as necessary 645.

Figure 7:
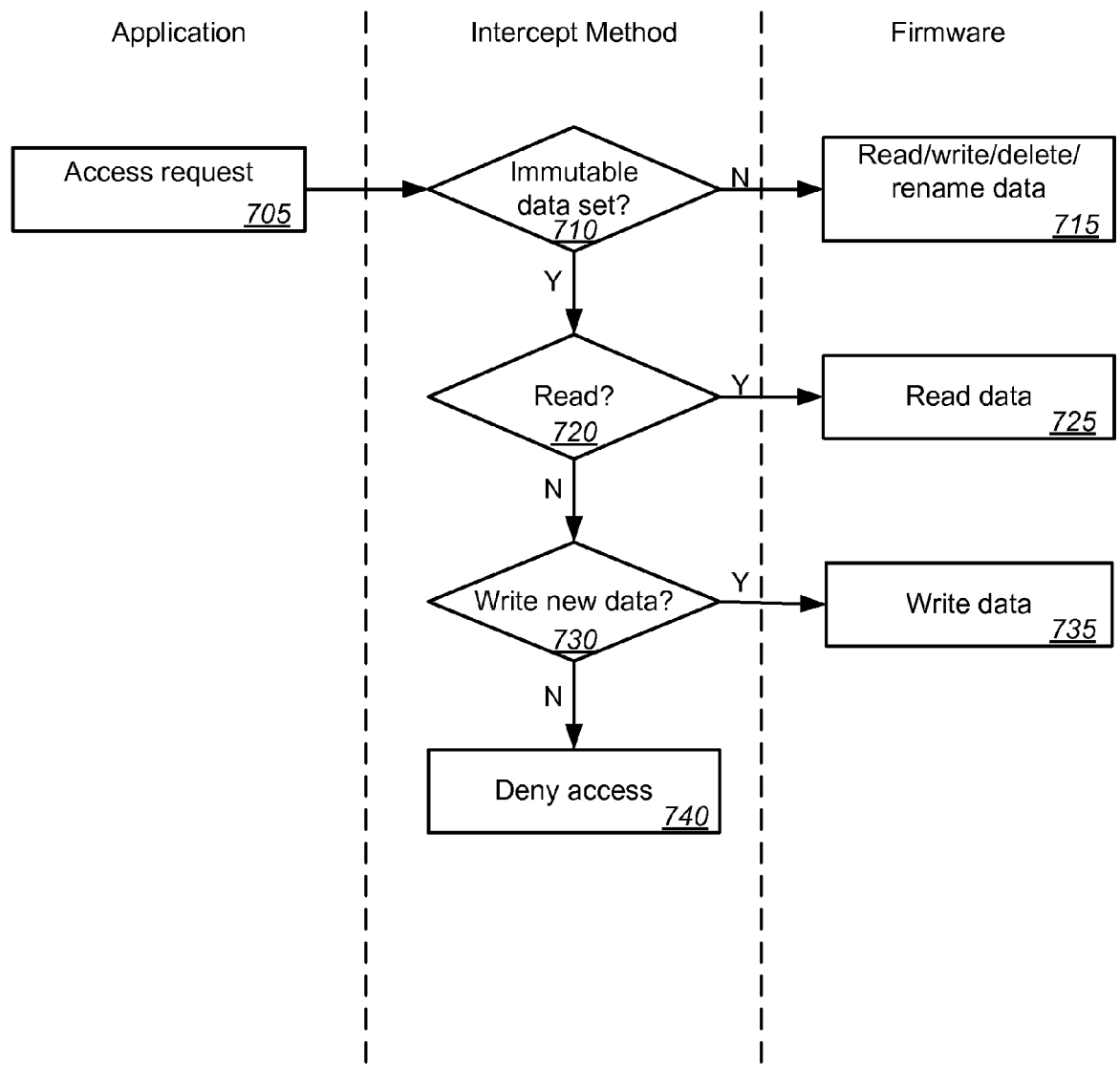
FIG. 7 is a diagram illustrating the interchange between an application, intercept method, and firmware to process an access request to removable media, according to certain embodiments of the present invention.

FIG. 7, illustrates how the intercept method can interact with different components to enforce WORM policies on immutable data and allow full access to changeable data, as illustrated in block 645 and method 200, according to one embodiment. For example, upon receiving an access request from an application 705, the intercept method can determine whether the access is to the immutable data set 710. If not, the intercept method can provide full access to the removable media, and the reads, writes, renames, and deletes can be performed by the firmware. If so, the intercept method will allow WORM access to the immutable data. That is, the intercept method can determine if the access request is a read 720. If so, the firmware can perform the read 725. If not, the intercept method can further determine whether it is an access request to write new data. If so, the firmware can perform the write 735. Otherwise, such as where the access request is to rename, delete, or otherwise modify immutable data the access is denied 740.

As noted above, embodiments of the present invention need not be limited to a removable disk or cartridge or any other particular type of storage medium. Rather, various types of removable media are contemplated and considered to be within the scope of the present invention. Similarly, embodiments of the present invention should not be considered to be limited to implementation on or with any particular type of computer system or environment. For example, while reference is made herein to a host computer, this should not be read to imply any use of a server or any other type of computing device or environment. Rather, any of a variety of different client, server, or other computers or computing devices may be used to implement various embodiments of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for accessing data on removable media having stored thereon a changeable data set comprising read-write data files and an immutable data set comprising WORM data, the system comprising:
    a removable media storage system configured to determine whether a host system is configured to enforce Write Once Read Many (WORM) policies, and the host system is communicatively coupled with the removable media storage system to execute a plurality of instructions for enforcing the WORM policies on the immutable data set stored on the removable media, the plurality of instructions executable by the host system to:
    receive a request to access data on the removable media;
    allow the access if the request is to write new read-write data files to the changeable data set;
    allow the access if the request is to any of read, write to, modify, rename and delete existing read-write data files of the changeable data set;
    allow the access if the request is to read existing WORM data of the immutable data set;
    allow the access if the request is to write new WORM data of the immutable data set;
    deny the access if the request is to write to existing WORM data of the immutable data set;
    deny the access if the request is to rename existing WORM data of the immutable data set; and
    deny the access if the request is to delete existing WORM data of the immutable data set;
    wherein the removable media storage system is further configured to grant the host system read-only access to the changeable and immutable data sets in response to determining that the host system is not configured to enforce the WORM policies.

2. The system as recited in claim 1, wherein the plurality of instructions are further executable by the host system to use one or more rules to determine the data comprising the immutable data set, the changeable data set, or both.

3. The system as recited in claim 2, wherein the one or more rules are stored on one or more of the removable media and the removable media storage system.

4. The system as recited in claim 2, wherein the one or more rules are based on a length of time data has been stored on the removable media, and the data becomes immutable after a certain period of time, access rights of a person using the host system, and access rights of a person who caused data to be stored on the removable media.

5. The system as recited in claim 2, wherein the one or more rules are configurable by a user.

6. The system as recited in claim 1, wherein the removable media storage system and the removable media are housed in a single module, the module being removable from the host system.

7. The system as recited in claim 1, wherein the removable media storage system is configured to access data from removable media including magnetic tape.

8. A method of enforcing WORM (Write Once Read Many) policies on removable media having stored thereon a changeable data set comprising read-write data files and an immutable data set comprising WORM data, the removable media is coupled to a host system, the method comprising:
    receiving a request to access data on the removable media;
    in response to determining that the host system is configured to enforce the WORM policies on the immutable data set stored on the removable media:
    allow the access if the request is to write new read-write data files to the changeable data set;
    allowing the access if the request is to any of read, write, modify, rename and delete existing read-write data files of the changeable data set;
    allowing the access if the request is to read existing read-write data files of the immutable data set;
    allowing the access if the request is to write new WORM data of the immutable data set;
    denying the access if the request is to write to existing WORM data of the immutable data set;
    denying the access if the request is to rename existing WORM data of the immutable data set; and
    denying the access if the request is to delete existing WORM data of the immutable data set; and
    in response to determining that the host system is not configured to enforce the WORM policies:
    granting the host system read-only access to data of the changeable data set;
    granting the host system read-only access to data of the immutable data set; and
    denying the host system write access to the data of the changeable data set.

9. The method of claim 8, further comprising in response to determining that the host system is configured to enforce the WORM policies on the removable media, using one or more rules to determine the immutable data set, the changeable data set, or both.

10. The method of claim 9, wherein the one or more rules are based on a length of time data has been stored on the removable media, and the data becomes immutable after a certain period of time.

11. The method of claim 10, wherein the one or more rules are further based on a type of data stored on the removable media, and a type of the removable media.

12. The method of claim 9, wherein the one or more rules are stored on the removable media.

13. The method of claim 8, wherein the removable media includes magnetic tape.

14. One or more non-volatile machine-readable media having machine-readable instructions thereon which, when executed by a computer or other processing device, implement the method of claim 8.

15. A method of enforcing WORM (Write Once Read Many) policies on removable media, the method comprising:
    determining whether at least a portion of the removable media is configured to store a changeable data set comprising read-write data files and an immutable data set comprising WORM data;
    determining whether a host system running one or more applications is configured to enforce the WORM policies on the immutable data set stored on the removable media;

in response to determining that the host system is configured to enforce the WORM policies, granting the one or more applications access to:

write new read-write data files to the changeable data set;

read, write data to, modify, rename, and delete existing read-write data files from the changeable data set;

write new WORM data to the immutable data set; and read existing WORM data from the immutable data set; and in response to determining that the host system is not configured to enforce the WORM policies, granting the one or more applications read-only access only, in order to read data from the changeable and immutable data sets, and denying the one or more applications write access, in order to prevent writing data to the changeable and immutable data sets.

16. A method as recited in claim 15, wherein determining whether at least a portion of the removable media is configured to store a changeable data set and an immutable data includes accessing one or more rules to determine data comprising the immutable data set and the changeable data set, wherein the rules are stored on the removable media.

17. A method as recited in claim 16, wherein the removable media includes magnetic tape.

18. A method as recited in claim 15, further comprising communicating one or more rules to the host system to determine whether the data sets on the removable media are changeable or immutable.

19. A method as recited in claim 18, wherein the one or more rules are based on a location of the data sets on the removable media.

20. A method as recited in claim 18, wherein the one or more rules are stored on the removable media.

21. One or more non-volatile machine-readable media having machine-readable instructions thereon which, when executed by a computer or other processing device, implement the method of claim 15.

* * * * *